United States Patent [19]

Dunning et al.

[11] 4,110,152

[45] Aug. 29, 1978

[54] EMBOSSING ROLLER AND APPARATUS

[75] Inventors: Richard E. Dunning, Munster, Ind.; Marshall A. Nelson, Lansing, Ill.

[73] Assignee: Avery Products Corporation, San Marino, Calif.

[21] Appl. No.: 781,529

[22] Filed: Mar. 25, 1977

Related U.S. Application Data

[63] Continuation of Ser. No. 588,853, Jun. 20, 1975, abandoned.

[51] Int. Cl.² .................... B32B 31/20; B21B 27/02
[52] U.S. Cl. .................... 156/553; 29/121.2; 425/374; 156/582
[58] Field of Search ............... 156/209, 219, 220, 235, 156/238, 241, 249, 553, 582, 555; 101/216, 376; 29/121.1, 121.2, 121.4, 121.5, 121.6, 125, 130; 425/363, 366, 373, 374

[56] References Cited

U.S. PATENT DOCUMENTS

| 2,254,501 | 9/1941 | Solem | 29/121.5 X |
|---|---|---|---|
| 2,761,547 | 9/1956 | Gehrer | 29/121.6 X |
| 2,793,585 | 5/1957 | Granitsas | 101/28 |
| 2,996,981 | 8/1961 | Reinartz et al. | 29/121 A |
| 3,109,368 | 11/1963 | Luttrell | 101/379 |
| 3,264,978 | 8/1966 | Staley | 101/23 |
| 3,434,862 | 3/1969 | Luc | 156/12 |
| 3,434,902 | 3/1969 | Bliss | 156/249 |
| 3,444,035 | 5/1969 | Bushnell | 156/220 |
| 3,458,376 | 7/1969 | Malik | 156/241 |
| 3,478,141 | 11/1969 | Dempsey et al. | 156/209 |
| 3,654,061 | 4/1972 | Berwanger | 156/195 |
| 3,761,338 | 9/1973 | Ungar et al. | 156/209 |
| 3,846,221 | 11/1974 | Golec | 156/582 |
| 3,920,113 | 11/1975 | Tamai | 101/376 |

*Primary Examiner*—Douglas J. Drummond
*Assistant Examiner*—William H. Thrower
*Attorney, Agent, or Firm*—Christie, Parker & Hale

[57] ABSTRACT

An embossing roller has protruding lands extending radially outward from the surface of the roller to provide corresponding indentations in a thermoplastic surface to which the roller may be applied. A layer of resilient material underlies the lands so that when the roller is rolled over an irregular surface, individual lands, or groups of lands, may be depressed different amounts so that embossing indentations are formed in all portions of the surface. By applying adequate pressure to the roller, all of the lands are depressed at their points of contact when in contact with the surface if the surface is flat and regular. The lands are forced by action of the resilient material into contact with the bottom of any slight concavity in the surface and adapt to any slight convexity. In some embodiments, lands protrude outwardly from metal rings which encircle the roller. In other embodiments, lands are supported directly by the resilient material. In a method of using the roller, a surface is substantially simultaneously coated and embossed by first pressing against the surface a portion of a film web which carries a thermally transferable coating, then heating the web, the coating and the surface, and then rolling the embossing roller across the web and the surface. The heating and pressing steps may be carried out with heated resiliently surfaced rollers which travel ahead of the embossing roller.

17 Claims, 35 Drawing Figures

STATION NO.1   STATION NO.2   STATION NO.3

STATION NO. 1    STATION NO. 2    STATION NO. 3

EMBOSSING ROLLER AND APPARATUS

This is a continuation, of application Ser. No. 588,853, filed June 20, 1975, now abandoned.

BACKGROUND OF THE INVENTION

1. Field of the Invention

This invention relates to embossing means, and more particularly to an embossing roller comprising outwardly extending lands to provide impressions in a pre-heated, thermoplastic surface. Preferably, the embossing roller is used with a film carrying a thermally transferable coating to substantially simultaneously coat and emboss a thermoplastic surface.

2. Prior Art

Embossing and printing rollers which comprise resilient elements are known. For example, U.S. Pat. Nos. 3,467,009 and 3,467,010 disclose such rollers. However, it is believed unknown to provide a roller having the construction herein described and more particularly to use such a roller in conjunction with the other elements of apparatus and method described in this application.

A device and method for transferring a thermally transferable coating from a foil carrier to a thermoplastically deformable surface comprises a plurality of movable, resiliently surfaced rollers which successively roll across a stationary surface to be coated. The rollers press against the surface a portion of a film web interposed between the rollers and the surface. The web carries a thermally transferable coating. The rollers are heated and resiliently surfaced, and suitable urged against the surface to heat the film, to heat the surface, and to press the film against the surface.

In conjunction with such rollers, an embossing roller of conventional structure may be used to form indentations in the thus coated surface. Protruding portions of the embossing roller may be urged against said web to force the web downward into the surface, thus forming indentations in the surface, with the coating being on the interior of each of the indentations. The film is subsequently stripped from the surface.

Such surfaces to be coated are generally not absolutely flat, but are usually characterized by irregularities; and it is found that embossed indentations are not suitably provided by such a roller in depressed, or relatively hollow, areas of the surface.

This disadvantage is overcome by the embossing roller of this invention being used in conjunction with the previously described resiliently surfaced heat rollers, or in conjunction with other means for pre-heating the web, coating, and surface, and pressing the web against the surface.

SUMMARY OF THE INVENTION

The present invention provides means and method for forming embossed indentations in a pre-heated, thermoplastic surface while substantially simultaneously coating the surface and the interior of the indentations with a thermally transferable coating.

Briefly, the embossing roller of this invention has protruding lands, or extending portions, which extend radially outward from the surface of the roller to provide corresponding indentations in a thermoplastic surface to which the roller may be applied. A layer of resilient material underlies the lands so that when the roller is rolled over an irregular surface, individual lands, or groups of lands, may be depressed different amounts so that embossing indentations are formed in all portions of the surface. By applying adequate pressure to the roller, all of the lands are depressed at their points of contact when in contact with the surface if the surface is flat and regular. The lands are forced by action of the resilient material into contact with the bottom of any slight concavity in the surface and adapt to any slight convexity. In some embodiments, the lands protrude outwardly from metal rings which encircle the roller. In other embodiments, lands are supported directly by the resilient material.

In a method of using the roller, a surface is substantially simultaneously coated and embossed by first pressing against the surface a portion of a film web which carries a thermally transferable coating, then heating the web, the coating, and the surface, and then rolling the embossing roller across the web and the surface. The heating and pressing steps may be carried out with heated, resiliently surfaced rollers which travel ahead of the embossing roller.

These and other aspects of the invention will be more fully understood by referring to the following detailed description and the accompanying drawings.

DETAILED DESCRIPTION OF THE PREFERRED EMBODIMENT

Structure

The structure of the embossing roller of the invention will be described in conjunction with FIGS. 1 through 21. Thereafter, in conjunction with other figures, the purpose and mode of operation of the several embodiments will be described, and the operation of the roller of the invention in conjunction with certain apparatus will be described.

Figure 1:
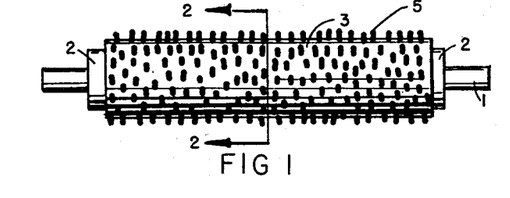
FIG. 1 is an elevation view showing an embossing roller according to this invention.
Figure 2:
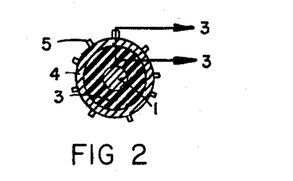
FIG. 2 is a cross-sectional view taken on lines 2—2 of FIG. 1.
Figure 3:
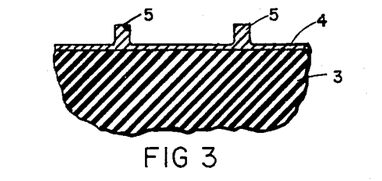
FIG. 3 is an enlarged fragmentary cross-sectional view taken on lines 3—3 of FIG. 2.

Referring now to FIGS. 1, 2 and 3, an embossing roller comprises a metal core 1, retaining collars 2, and a rubber layer 3. Overlying rubber layer 3 is a layer of metal 4 which may be on the order of 0.001 inch thick. Layer 4 preferably constitutes the metal which remains after etching an original layer having a thickness on the order of about 0.020 inch, to provide lands 5 extending upward therefrom, which may be about 0.020 inch high. The height of each land 5 is preferably at least about five times as great as the thickness of the layer 4.

Figure 4:
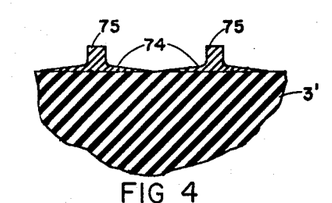
FIG. 4 is an enlarged fragmentary cross-sectional view corresponding to FIG. 3 and showing a modification of the embodiment of FIG. 3.

FIG. 4 shows a modification of the embodiment of FIGS. 1, 2 and 3 in which etching is carried out so that metal portions 74, unlike metal layer 4, are not continuous, but each constitutes a broadening of the base of each of the lands 75, the bases 74 being adhered to resilient rubber layer 3'. Each of the lands 75 is thus free to move with its base 74 independently with respect to the next adjacent such land and base.

The rubber of layers 3, 3', 13, 23, 33, 43 and 53 is preferably a heat-resistant rubber such as silicone rubber, and may for example have a durometer measurement of 50 or 60.

Figure 5:
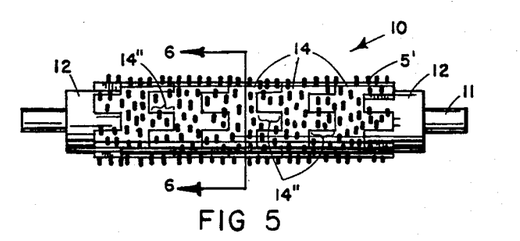
FIG. 5 is an elevation view showing an alternate embossing roller according to this invention.
Figure 6:
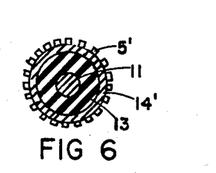
FIG. 6 is a cross-sectional view taken on lines 6—6 of FIG. 5.

FIGS. 5 and 6 show another embodiment in which a roller 10 comprises a metal core 11, retaining collars 12, resilient rubber layer 13, and a plurality of metal rings 15 overlying and adhered to the rubber layer 13. Lands 5' may extend upwardly from rings 14. Each of rings 14 may extend continuously around the circumference of the roller, but each of rings 14 may be independent and unattached to each of rings 14 adjacent thereto, and thus the metal layer 14' may be discontinuous longitudinally. The cross-sectional appearance is preferably that of FIG. 3, i.e., a fragmentary cross-sectional view taken with respect to FIG. 6 in the manner in which FIG. 3 is taken with respect to FIG. 2. Rings 14 may be characterized by interlocking, longitudinally extending portions 14" which may be said to be "interdigitating."

Figure 7:
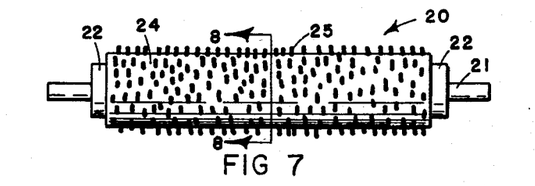
FIG. 7 is an elevation view showing another alternate embossing roller.
Figure 8:
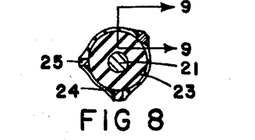
FIG. 8 is a cross-sectional view taken on lines 8—8 of FIG. 7.
Figure 9:
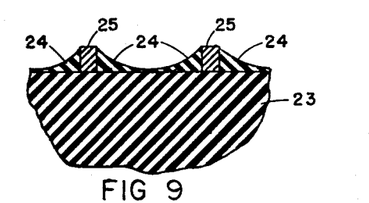
FIG. 9 is an enlarged fragmentary cross-sectional view taken on lines 9—9 of FIG. 8.

Referring to FIGS. 7, 8 and 9, a roller 20 comprises a core 21, retaining rings 22, rubber layer 23, and a plurality of metal lands 25 protruding from the surface. Each of lands 25 may be abutted by rubber portion 24.

Figure 10:
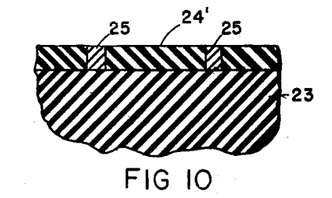
FIG. 10 is a view corresponding to FIG. 9 and showing a step in the preparation of the embodiment shown in FIGS. 7, 8 and 9.
Figure 11:
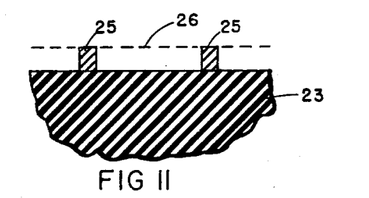
FIG. 11 is an enlarged fragmentary cross-sectional view corresponding to FIG. 10 and showing a step preceding the step of FIG. 10 in the process of preparing the embodiment of FIGS. 7, 8 and 9.

The device of FIGS. 7, 8 and 9 may be made by first providing a continuous metal layer as indicated by dashed lines 26 in FIG. 11, then etching away portions of this layer to provide lands 25 adhered to and protruding from layer 23, then, as shown in FIG. 10, depositing a layer of resilient rubber material between the lands to fill the space between the lands and provide an even surface for rubber layer 24', and then by application of a wire brush or the like to remove a portion of the rubber layer 24' to provide portions 24 (shown in FIG. 9) abutting lands 25.

Figure 12:
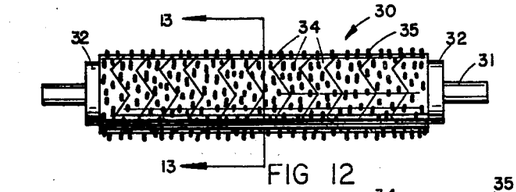
FIG. 12 is an elevation view showing another alternate embossing roller according to this invention.
Figure 13:
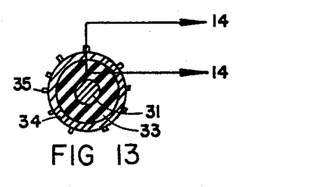
FIG. 13 is a cross-sectional view taken on lines 13—13 of FIG. 12.
Figure 14:
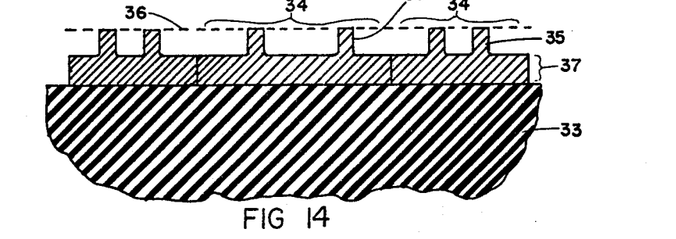
FIG. 14 is an enlarged fragmentary cross-sectional view taken on lines 14—14 of FIG. 13.

FIGS. 12, 13 and 14 show another embodiment in which a roller 30 comprises a metal core 31, retaining collars 32, rubber layer 33, and a plurality of metal rings encircling and adhered to the layer 33. The rings 34 may comprise protruding metal lands 35. Roll 30 may be formed by first providing a metal layer comprising rings 34 having even upper surfaces indicated by dashed lines 36, and then etching to remove a portion of the metal so that lands 35 extend upward from the metal base layer 37 of each of the rings 34. The rings 34, like rings 14, are unattached to each other and, in a manner somewhat similar to rings 14, may comprise longitudinally extending portions which may interlock so that rings 34 may be described as "interdigitating". In this embodiment, unlike the embodiment of FIGS. 1 and 2, the height of the lands may be, if desired, less than five times the thickness of the base layer.

Interdigitation of the extending portions of rings such as rings 14 and 34 may be provided to lessen the likelihood that indentations formed by one ring may be distinguished from the indentations formed by the next adjacent ring in viewing the surface of the completed coated indented article.

Figure 15:
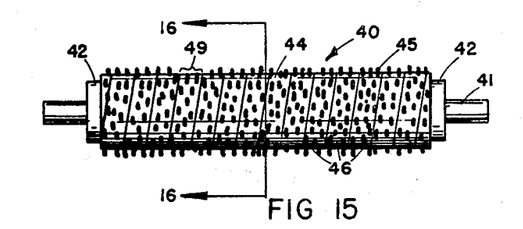
FIG. 15 is an elevation view showing another alternate embossing roller according to this invention.
Figure 16:
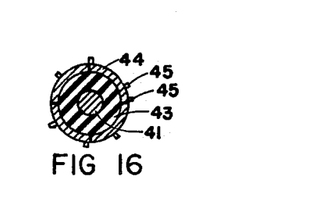
FIG. 16 is a cross-sectional view taken on lines 16—16 of FIG. 15.

Referring to FIGS. 15 and 16, a roller 40, which is a modification of roller 30, comprises a metal core 41, retainer rings 42, a rubber layer 43, and a metal layer 44 which may comprise lands 45 extending upward therefrom and may be in the form of a spiral so that each ring, or twist, or helical turn of the spiral, as indicated at 46, may be depressed independently.

Figure 17:
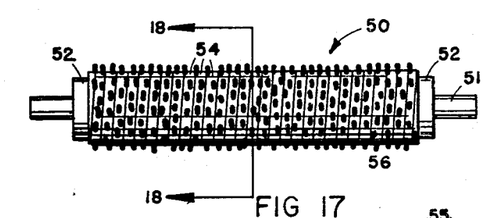
FIG. 17 is an elevation view showing another alternate embossing roller which constitutes a modification of the embodiment of FIG. 15.
Figure 18:
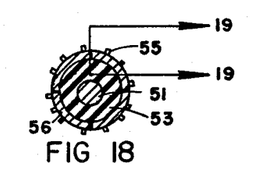
FIG. 18 is a cross-sectional view taken on lines 18—18 of FIG. 17.
Figure 19:
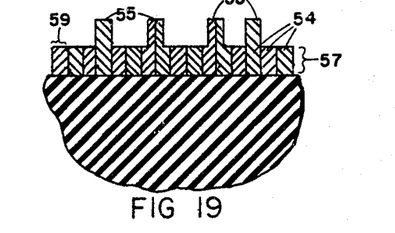
FIG. 19 is an enlarged fragmentary cross-sectional view taken on lines 19—19 of FIG. 18.

FIGS. 17, 18 and 19 show a roller 50 which is a modification of the roller 40 and comprises a metal core 51, retainer rings 52, and a rubber layer 53. The metal layer 56 having a thickness indicated at 57 may have lands 55 extending upwardly therefrom, and may comprise a plurality of very thin rings 54 connected in spiral fashion so that roll 50 may be described as being similar to roller 40, except that the pitch angle of the spiral is much lower, and that the number of turns per inch are much greater, and each turn of the spiral is much thinner longitudinally; that is, the thickness of each of the rings 54, as indicated at 59, is much less than that of each of the turns 46 as indicated at 49.

Figure 20:
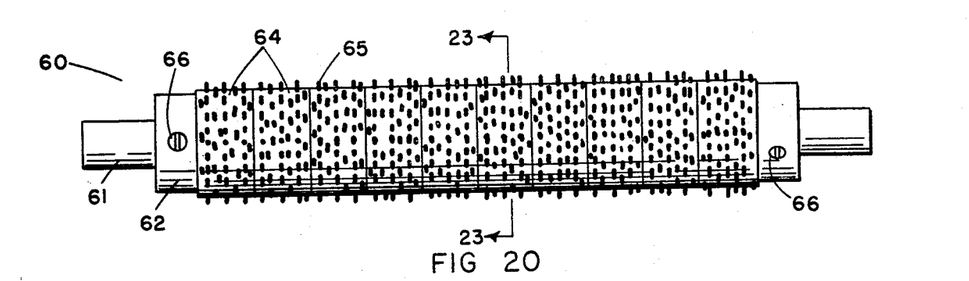
FIG. 20 is an elevation view showing another alternate embossing roller according to this invention.
Figure 21:
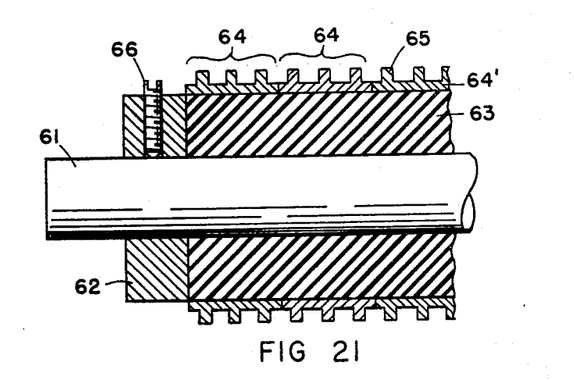
FIG. 21 is an enlarged, partially cross-sectional view showing one end of the roller of FIG. 20.

FIGS. 20 and 21 show another embodiment which is a modification of the embodiment shown in FIGS. 5 and 6, or of the embodiment shown in FIGS. 12, 13 and 14. A roller 60 comprises a metal core 61, retainer rings 62, and a layer 63 of resilient material. Each of a plurality of metal rings 64 may encircle the cylindrical rubber member 63. The rings 64 may be closely adjacent to, but unattached to, each other, and each may constitute a metal layer 64' having metal lands 65 extending upwardly therefrom. The lands 65 may correspond to lands 35, and may be made similarly, and the remaining metal of the rings may correspond to layer 37 so that the longitudinally discontinuous layer of metal 64' is provided. The rings 62 may be attached to the shaft 61 by set screws 66 extending through it and engaging the shaft 61. The rings 62 prevent the rubber of layer 63 from being squeezed, or extruded longitudinally or axially outward along the shaft 61 by reason, for example, of any pressure which may be exerted laterally upon the rings 64.

The retainer rings shown and described in connection with previously described embodiments may serve a similar or identical function, and may be attached in like manner, or in any other suitable way, the showing of means of attachment for such rings having been omitted in the description of other embodiments for simplicity.

Operation of the Rollers

Figure 22:
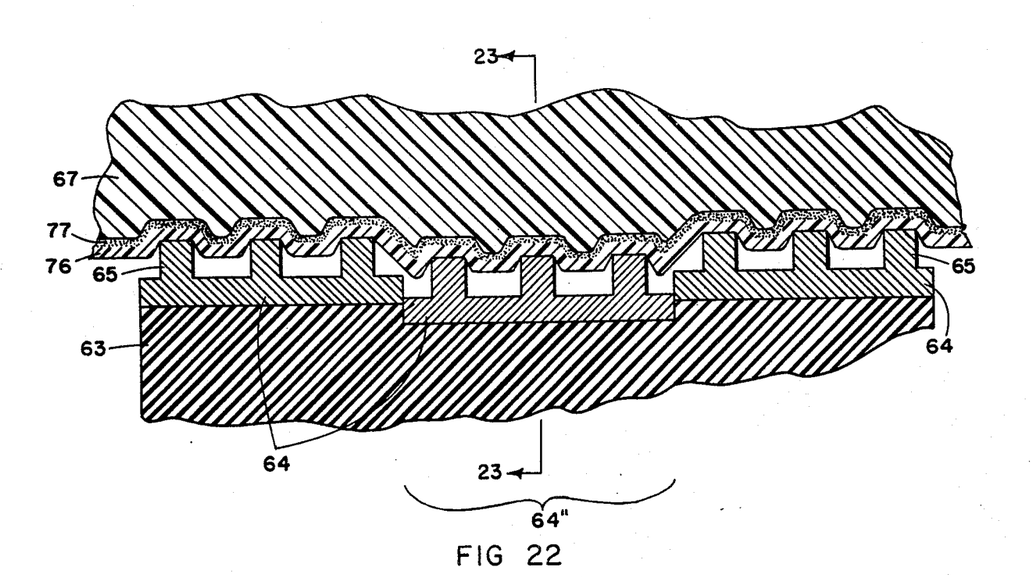
FIG. 22 is an enlarged fragmentary cross-sectional view taken in the same manner as FIG. 21.

FIG. 22 shows three adjacent rings 64 in lateral abutting relation to a schematically indicated uneven thermoplastic surface 67. Film web 76 carrying coating 77 is shown interposed between the rings 64 and the surface 67. As may be seen, one ring is depressed at the surface, this ring being indicated as 64''', while the two adjacent rings are not so depressed. Thus, a portion of one ring and the lands extending therefrom may be displaced with respect to adjacent rings without corresponding displacement of adjacent rings. Likewise, either one or both of the adjacent rings may be depressed to a like extent, or to a greater or lesser extent, without affecting the displacement of any ring adjacent to it.

Figure 23:
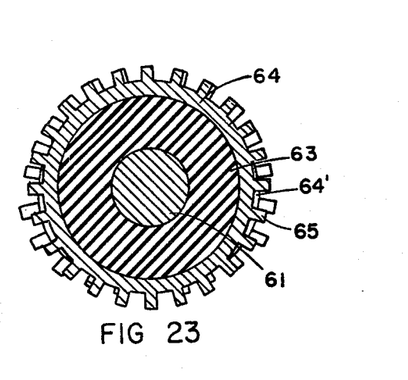
FIG. 23 is an enlarged cross-sectional view corresponding to a view taken on lines 23—23 of either FIGS. 20 or 22.

In FIG. 23, the relative relation of a partially displaced ring, such as ring 64', with respect to an undisplaced ring, such as one of rings 64, is shown. The surface causing such relative displacement is omitted for the sake of clarity.

Displacement of rings 14 and 34 may take place in the same manner as described for rings 64 in FIGS. 21 and 22. Likewise, the displacement of the helical turns 49 and 54 may take place in similar fashion.

Figure 24:
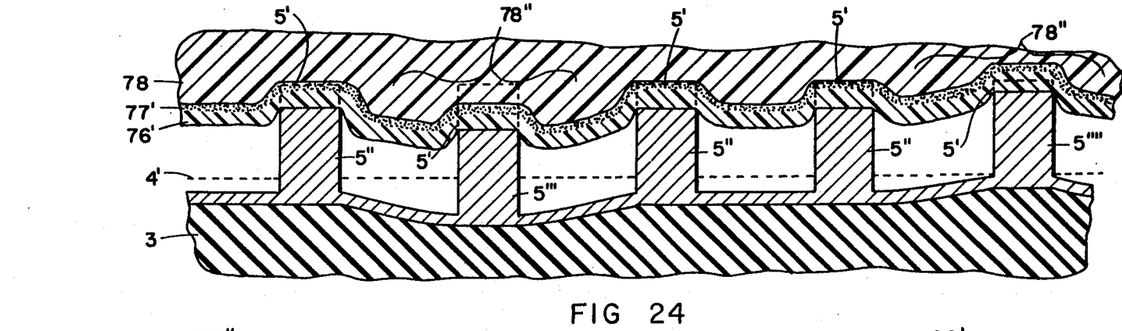
FIG. 24 is a view corresponding to that of FIG. 3 showing the operation of the device.

FIG. 24 shows the normal undisplaced position of the metal layer 4 and the lands 5 indicated by dotted lines at 4' and 5'.

Each of the lands indicated as 5'' is shown as displaced substantially equal amounts and in contact with the web 76' which carries the coating 77', thereby providing indentations in the coating 77' and correspondingly in the thermoplastic surface 78. The land 5''' forms an indentation in a positive or convex irregularity in the surface 78, as indicated at 78', while the land 5'''' is substantially hardly displaced at all and provides an indentation in a concave irregularity in surface 78, as indicated at 78''.

Figure 25:
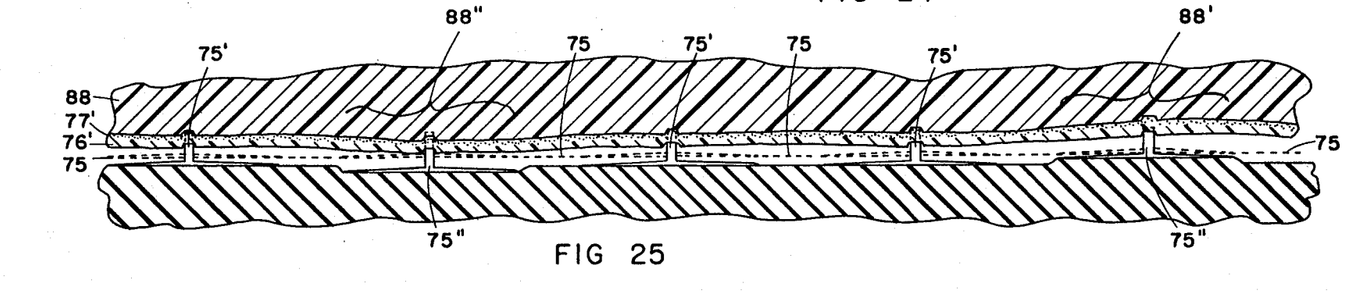
FIG. 25 is a view corresponding to FIG. 4 showing the operation of the device.

FIG. 25 shows a somewhat irregular thermoplastic surface 88. Normal undepressed positions of the lands 75 are shown in dashed lines and indicated at 75. Those lands which are substantially equally depressed and which provide indentations in the substantially flat portion of surface 88 are indicated at 75', while the land 75'', shown very slightly depressed, provides an indentation in a concave irregularity in surface 88 as indicated at 88', whereas the land 75'' provides an indentation in a substantially convex irregularity in the surface 88 as indicated at 88''.

Figure 26:
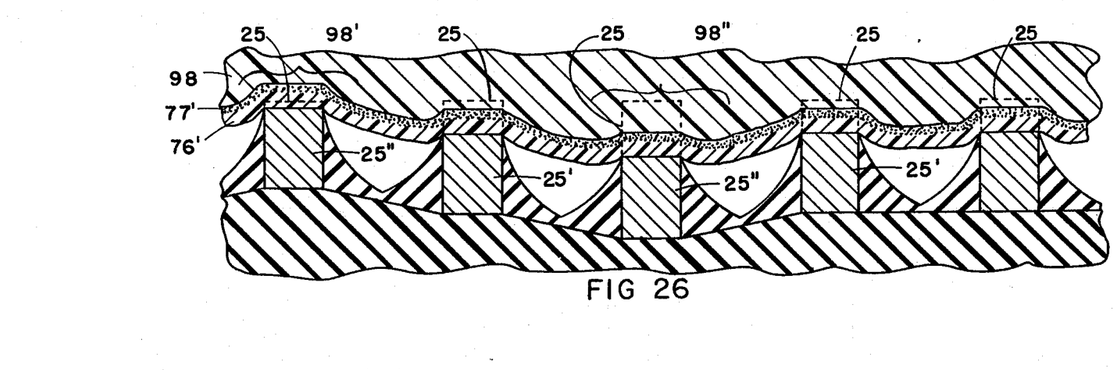
FIG. 26 is a view corresponding to FIG. 9 showing the operation of the device.

FIG. 26 shows a somewhat irregular thermoplastic surface 98. Normal undepressed positions of the lands 25 are shown in dashed lines. Those lands which are substantially equally depressed and which provide indentations in the substantially flat portion of surface 98 are shown at 25', while the land 25'', shown very slightly depressed, provides an indentation in a concave irregularity in the surface 98 and shown at 98'. The lands 25'' provide an indentation in a substantially convex irregularity in the surface 98 as indicated at 98''.

In FIGS. 27, 28, 29, and 30, the roller 181a is any one of the rollers of the embodiments described in FIGS. 1 through 21.

Figure 27:
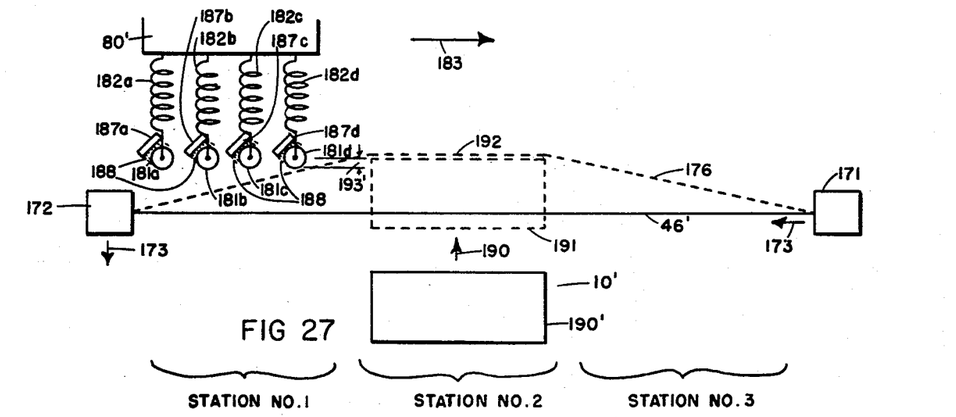
FIG. 27 is a schematic elevation illustrating two steps in the process.

Referring to FIG. 27, the film web 46' is stored and unwound from the apparatus shown schematically at 171. It is pulled through the device by pulling means indicated schematically at 172 and travels, when it travels, in the direction indicated by the arrows 173. An object 10' to be coated is disposed at 190' substantially below the web 46', and while it is so disposed, the carriage 80' which carries rollers 181 (designated 181a, 181b, 181c, 181d) is located at a first station disposed to the right of the means 172 and to the left of a second station at which the object 10' is located. The rollers 181 are urged downwardly by resilient means such as the springs 182 (designated 182a, 182b, 182c, 182d). The rollers 181 have respective heating means 187 (designated 187a, 187b, 187c and 187d) which may provide radiant energy, indicated by arrows 184, to heat the rollers to which the rays of energy are directed. In place of the heating devices 187 shown in FIGS. 27 and 28, there may be provided heating devices indicated schematically at 189, shown in FIG. 29, designated respectively 189a, 189b, 189c 189d. While the parts are in this position, the web is fed, or advanced, as indicated by arrow 175, to dispose above the object 10' a portion of the web 46' which carries a portion of the web from which coating has not been previously transferred. The object 10' is then moved upward as indicated by the arrow 190. At its uppermost position, as indicated in dashed lines at 191, its upper surface 192 first contacts the web 46', and then carries it into the position shown at 176. Upper surface 192 is parallel to the path to be travelled by carriage 180, this path being indicated by arrow 183. An appreciable overlap or interference (as indicated at 193) is provided between a projection of the bottom of rollers 181 and the projection of the top of surface 192.

Figure 28:
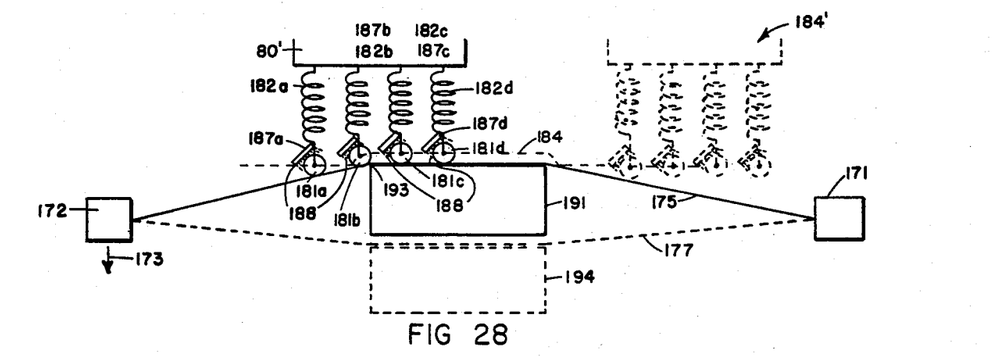
FIG. 28 is a schematic elevation illustrating steps in the process following those of FIG. 27.

In FIG. 28, the object 10' and the web 46' are shown at the positions 191 and 175, respectively, which they occupy at the end of the steps described for FIG. 27. The carriage 180 is shown moving from its position at station 1, as shown in FIG. 27, toward the station 2. The center of the rollers 181 travels in the path indicated in dashed lines at 184. As each contacts the edge 193 of the object 10′, it is forced upwardly, compressing one of the springs 182. Thus, the rollers 181b and 181c, which are in contact with the upper surface 192 of the object 10′ (through web 46′ indicated at 176), are in their uppermost positions, and the springs 182d and 182c are compressed as shown. The spring 182b is shown as only partially compressed, because the roller 181b which has just contacted the corner 193 has not been fully raised, and the spring 182a is in its extended position, since roller 181a has not yet contacted the object 10′, that is, the corner 193. Carriage 180 continues to travel until it reaches the position shown at 184 in dashed lines (station 3), whereupon the rollers 181 return to their downwardmost position and springs 182 to their most extended positions as shown in dashed lines. Lowering of the object 10′ is then initiated, and it may travel downward to the position shown in dashed lines at 194. Due to the adhesiveness of the coating, both for object 10′ and for the film of web 46′, web 46′ may be carried into the position shown in dashed lines at 177. When lowering of object 10′ has progressed until the upper surface 192 is sufficiently below the path 185 travelled by the rollers during their return, return of the carriage and rollers may be initiated. Thus, the rollers do not contact either the web, or the object, during their return.

Figure 29:
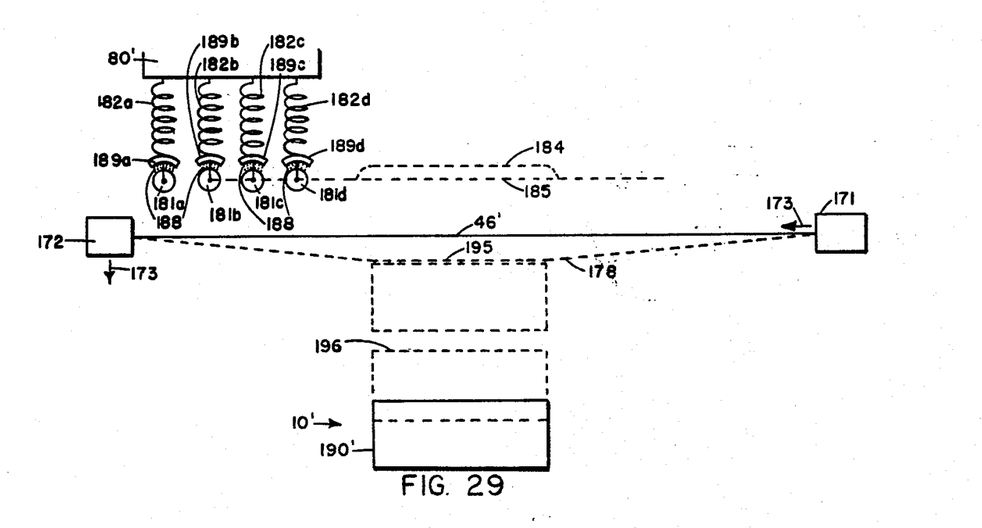
FIG. 29 is a schematic elevation illustrating steps in the process following those of FIG. 28.

The speed of carriage 80′ while travelling from the beginning to the end of its path, that is, from its initial location at station 1, as shown in FIGS. 27 and 29, to the termination of its path at station 3, as shown in FIGS. 27 and 29, may be different from its speed in returning from the latter point to the former, that is, from station 3 to station 1. Preferably, its return speed is appreciably greater than its speed of travel from station 1 to station 3 so that the rollers may travel over the object 10′ at a speed suitable to provide maximum heating and pressure on the web 46′ and on the coating to be transferred and on the surface 192 during travel through station 2, but minimum time is occupied during the return travel, that is, from station 3 to station 1.

The object 10′ may travel from the position shown at 194 to the position shown at 195, and then to the position shown at 190′, its top surface at these various locations being indicated respectively at 195 and 196 (FIG. 29). As it thus travels, web 46′ begins to peel from the surface, beginning first at the corners, leaving the coating adhered to the upper surface of object 10′. Thus, as shown in dashed lines, web 46′ as indicated at 178, has begun to peel from the upper surface of object 10′, and when the object 10′ occupies the position indicated at 196, the web 46′ has almost completely peeled from said upper surface, so that when the object reaches the position shown at 190′, the completion of the peeling of the web has been accomplished, and the web occupies the position shown at 46′, and may then be advanced as indicated by the arrow 173. Thus, the position shown in the beginning of the first step in FIG. 27 has been reached.

Figure 30:
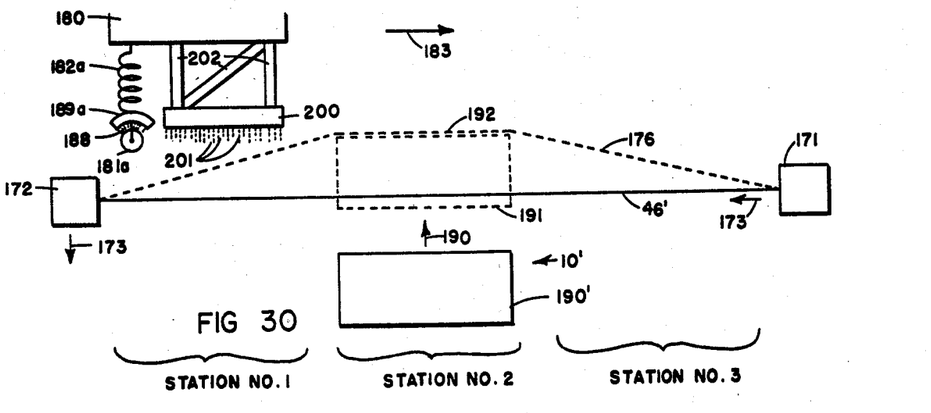
FIG. 30 is a schematic elevation illustrating steps in the process which may be used in place of those of FIG. 27.
Figure 31:
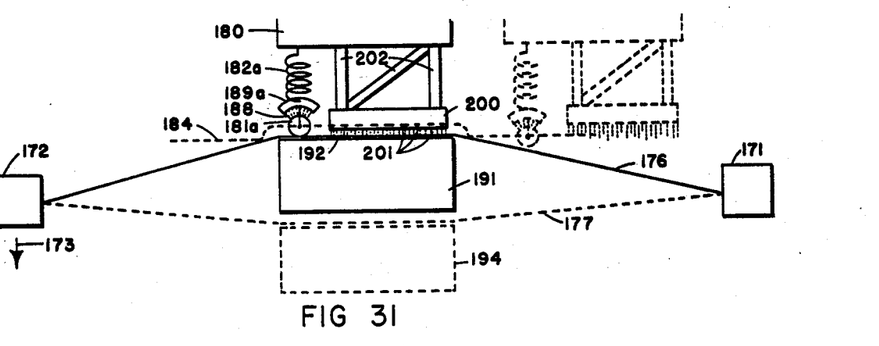
FIG. 31 is a schematic elevation illustrating steps in the process which may be used in place of those of FIG. 28.
Figure 32:
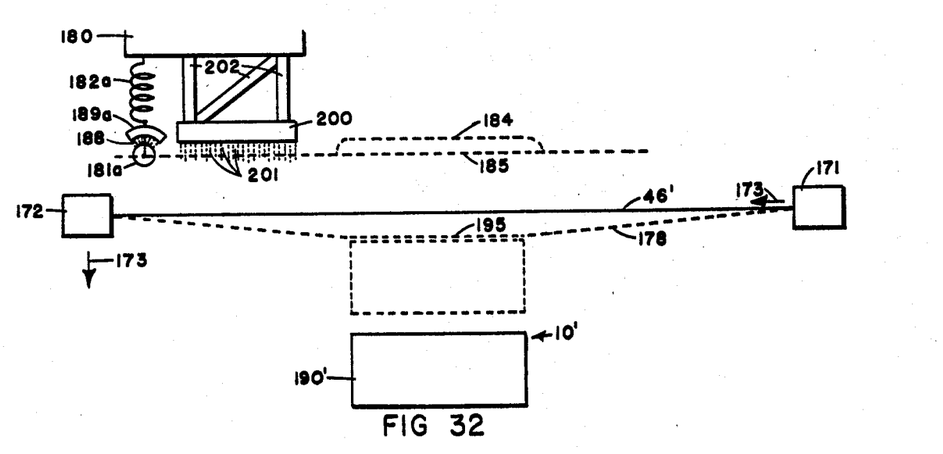
FIG. 32 is a schematic elevation illustrating steps in the process which may be used in place of those of FIG. 29.

Referring to FIGS. 30, 31 and 32, the carriage 180 may correspond to and replace carriage 80 or 80′, and in place of the rollers 181b, 181c and 181d, and associated apparatus, the device 200 may be used to emit radiation indicated by the arrows 201. The radiation may be infra-red radiation to provide heating of surface 192 and web 176 by infra-red radiation, or may be radiation suitable to provide dielectric heating of the web 176 and the surface 192. The device 200 may be supported from the carriage 180 by rigid frame members 202.

In FIG. 30, the film web 46′ is stored and unwound as described for FIG. 27. All of the description of FIG. 27 applies to FIG. 30, except that the web and surface are heated by radiation 201.

FIG. 31 corresponds to FIG. 28, and the description of FIG. 28 applies to FIG. 31, except that in place of the action of the rollers 181, the device 200 provides radiation 201 to pre-heat the web and surface 192. The path of the axis of the roller 181a is indicated in dashed lines at 184. The roller travels as described for FIG. 28.

Likewise, the description of the parts in FIG. 29 applies to FIG. 32, with the exception that device 200 is used in place of the rollers 181d, 181c and 181b. The paths of the axis of the roller 181a are indicated in dashed lines at 184 and 185.

The roller 181a is heated by the device 185a which may emit radiation indicated by the arrows 184 in FIGS. 27 through 35.

Figure 33:
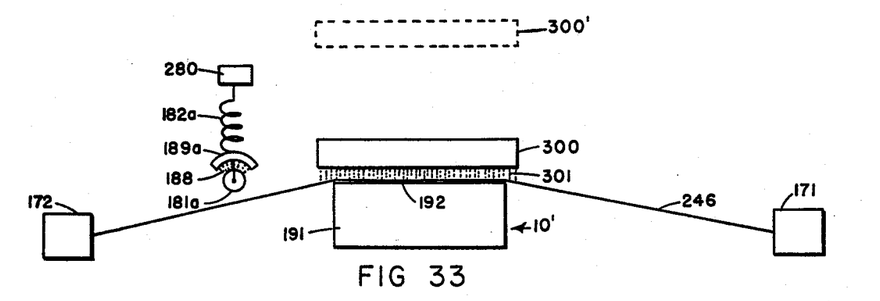
FIG. 33 is a schematic elevation illustrating further modification of the process.

Referring to FIG. 33, the web 246 overlays the surface 192 of the object 10′, and the web and surface 192 are heated by radiation 301 emitted from the device 300 which provides radiant infra-red heating, or dielectric heating, as described for radiation 201. After such heating is completed, the device 300 may be withdrawn to the position shown in dotted lines in FIG. 33 at 300′, and in solid lines in FIG. 34 at 300′, and after the device 300 is withdrawn to the position shown at 300′, the carriage 280 may travel in the manner described for carriage 80′ and 180 to move the roller 181a in the manner described for the roller 181a in FIGS. 27 through 32. The path of the roller is indicated at 184 in dashed lines in FIG. 34.

Figure 34:
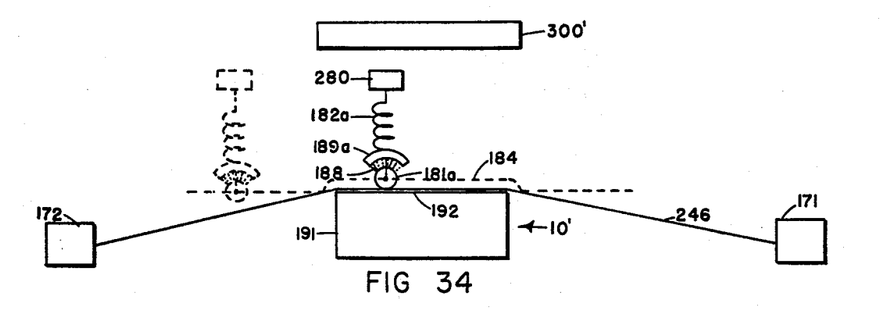
FIG. 34 is a schematic elevation illustrating steps in the process following those of FIG. 33.
Figure 35:
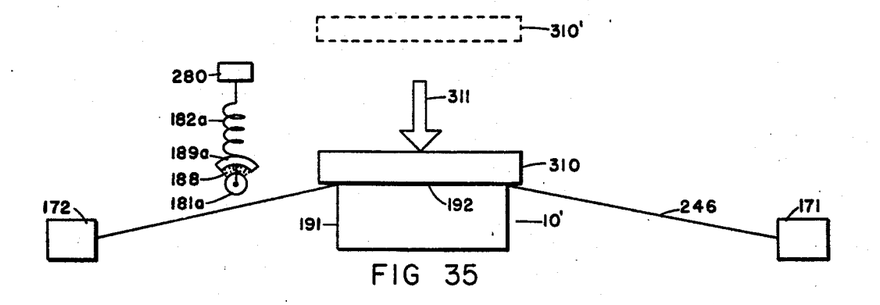
FIG. 35 is a schematic elevation illustrating a modification of the process steps of FIG. 33.

Referring to FIG. 35, a heated platen 310 may be used in place of the device 300. The heated platen 310 is forced by pressure indicated by arrow 311 against the web 246 and surface 192 of the object 10′. After the web 246 has been pressed against the surface 192, and both the web 246 and surface 192 have been heated by the platen 310, the platen 310 is withdrawn into the position shown in dashed lines at 310′. The carriage 280 and roller 181a then travel as shown in FIG. 34 and described in previous figures to provide embossed indentations in the web 246 and surface 192. In the processes illustrated in FIGS. 34 and 35, after the roller 181a has completed its travel to station 3, the web may be peeled from surface 192 in the manner described for FIGS. 32 and 29, so that after completion of the process, the surface 192 has embossed indentations with a thermally transferred coating on both the indented and unindented portions.

We claim:

1. Apparatus for embossing and coating a plastically deformable surface comprising:

a web of film carrying a thermally transferable coating;

means for disposing over the plastically deformable surface a portion of the web;

means for heating the surface, film, and coating;

an embossing roller comprising resiliently supported, separate, independently movable rings disposed adjacent one another across the width of the roller, the rings extending concentrically around the roller and being resiliently movable radially relative to the rotational axis of the roller; and a plurality of discrete mutually spaced apart rigid lands protruding radially from each ring around the circumference of the ring for being resiliently movable with corresponding movement of the ring;

means for urging the roller against the film and surface with the axis of the roller extending across the width of the film and surface; and means for rolling the roller over the film and the surface to thereby roll the film and coating against the surface while the roller is so urged to emboss a plurality of discrete spaced apart three-dimensional indentations across the width of the film and the surface;

the lands on each ring being resiliently movable independently of lands on a separate ring as well as lands on each ring being resiliently movable in response to irregularities in the surface for embossing a substantially uniform pattern of indentations across the width and along the length of the surface.

2. Apparatus according to claim 1 wherein the lands on each ring are mutually and randomly spaced apart across the width of each ring and circumferentially around the ring.

3. Apparatus according to claim 1 wherein each ring is rigid and is adhered to a resilient core of the roller.

4. Apparatus according to claim 3 in which each ring and the lands on each ring are made of metal.

5. Apparatus according to claim 4 in which each metal ring has a thickness less than one-fifth the height of the metal lands extending from the ring.

6. Apparatus for transfering a thermally transferable coating from a film carrier to a thermoplastically deformable surface of an article comprising thermoplastic material and in the same operation thermoplastically embossing the surface, comprising:

means for presenting and maintaining the surface stationary;

means for disposing the film unmoving above the surface;

means for pre-heating the surface and the film;

at least one embossing roller movable in a path parallel to the surface, the roller comprising a layer of heat-resistant, resilient material; separate, independently movable rings resiliently supported by the resilient material, the rings being disposed adjacent one another across the width of the roller, the rings extending concentrically around the roller and being resiliently movable radially relative to the roational axis of the roller; and a plurality of discrete mutually spaced apart rigid lands protruding radially from each ring around the circumference of the ring for being resiliently movable with corresponding movement of the ring;

means for heating the roller; and means for urging the roller against the pre-heated film and the pre-heated surface with the axis of the roller extending across the width of the film and the surface to simultaneously force the pre-heated film against the pre-heated surface and force the lands and film portions contacted by the lands into the surface to thereby emboss a plurality of discrete spaced apart three-dimensional indentations across the width of the film and surface;

the lands on each ring being resiliently movable independently of lands on a separate ring as well as lands on each ring being resiliently movable in response to irregularities in the surface to thereby provide a substantially uniform pattern of embossed indentations across the width and along the length of the surface and to transfer the coating to both the portions of the surface thus indented and the portions of the surface not indented.

7. Apparatus according to claim 6 wherein the lands on each ring are mutually and randomly spaced apart across the width of each ring and circumferentially around the ring.

8. Apparatus according to claim 6 wherein each ring is rigid and is adhered to the resilient layer.

9. Apparatus according to claim 6 in which the means for pre-heating the film and the surface comprises at least one heated resiliently surfaced roller.

10. Apparatus according to claim 9 in which the means for pre-heating the film and the surface comprises a plurality of heated resiliently surfaced rollers.

11. Apparatus according to claim 6 in which the rings are interdigitating.

12. An embossing roller comprising:

a core;

a layer of heat-resistant, resilient material surrounding the core; and a plurality of resiliently supported, separate, independently movable rings disposed adjacent one another across the width of the roller and adhered to the resilient material, the rings extending concentrically around the roller and being resiliently movable radially relative to the rotational axis of the roller; and a plurality of discrete mutually spaced apart rigid lands protruding radially from each ring around the circumference of the ring for being resiliently movable radially with corresponding movement of the ring, the lands on each ring being resiliently movable independently of lands on a separate ring as well as lands on each ring being resiliently movable in response to irregularities in a surface across which the roller is rolled.

13. Apparatus according to claim 12 in which each ring and the lands on each ring are made of metal.

14. Apparatus according to claim 13 in which each ring has a thickness less than one-fifth the height of the lands extending from the ring.

15. Apparatus according to claim 12 in which the rings are interdigitating.

16. Apparatus according to claim 12 wherein each ring is rigid.

17. Apparatus according to claim 12 wherein the lands on each ring are mutually and randomly spaced apart across the width of each ring and circumferentially around the ring.

* * * * *

UNITED STATES PATENT OFFICE
CERTIFICATE OF CORRECTION

Patent No. 4,110,152                  Dated August 29, 1978

Inventor(s) Richard E. Dunning et al.

It is certified that error appears in the above-identified patent and that said Letters Patent are hereby corrected as shown below:

Column 1, line 32, "suitable" should read --- suitably ---.

Signed and Sealed this

Twenty-second Day of May 1979

[SEAL]

Attest:

RUTH C. MASON
*Attesting Officer*

DONALD W. BANNER
*Commissioner of Patents and Trademarks*